(12) United States Patent
Kikuchi et al.

(10) Patent No.: US 8,558,621 B2
(45) Date of Patent: Oct. 15, 2013

(54) DRIVER AMPLIFIER CIRCUIT AND COMMUNICATION SYSTEM

(75) Inventors: Hidekazu Kikuchi, Kanagawa (JP);
Tomokazu Tanaka, Kanagawa (JP);
Kunio Gosho, Kanagawa (JP)

(73) Assignee: Sony Corporation, Tokyo (JP)

( * ) Notice: Subject to any disclaimer, the term of this patent is extended or adjusted under 35 U.S.C. 154(b) by 102 days.

(21) Appl. No.: 13/067,935

(22) Filed: Jul. 8, 2011

(65) Prior Publication Data

US 2011/0304399 A1    Dec. 15, 2011

(30) Foreign Application Priority Data

Sep. 6, 2010    (JP) ................... 2010-198761

(51) Int. Cl.
*H03F 1/00* (2006.01)
*H03F 3/04* (2006.01)

(52) U.S. Cl.
USPC .............. 330/291; 330/290; 330/296; 326/82; 326/86

(58) Field of Classification Search
None
See application file for complete search history.

(56) References Cited

U.S. PATENT DOCUMENTS

| | | | | |
|---|---|---|---|---|
| 6,025,742 A  * | 2/2000 | Chan | .............................. | 327/108 |
| 6,380,797 B1 * | 4/2002 | Macaluso et al. | ............. | 327/513 |
| 6,975,141 B2 * | 12/2005 | Mueller et al. | ................... | 326/83 |
| 7,330,056 B1 * | 2/2008 | Lu | .................. | 327/108 |
| 8,149,024 B2 * | 4/2012 | Liu et al. | ........................ | 327/108 |
| 8,258,813 B2 * | 9/2012 | Groepl et al. | .................... | 326/82 |
| 2003/0122593 A1* | 7/2003 | Volk | ................................ | 327/108 |
| 2010/0109794 A1* | 5/2010 | Groepl et al. | ................... | 333/32 |
| 2011/0133788 A1* | 6/2011 | Liu et al. | ....................... | 327/108 |

* cited by examiner

*Primary Examiner* — Shawki Ismail
*Assistant Examiner* — Nelson Correa
(74) *Attorney, Agent, or Firm* — Rader, Fishman & Grauer PLLC (57) ABSTRACT

Disclosed herein is a driver amplifier circuit, including: a first current source transistor of a first conductivity type, and a second current source transistor of the first conductivity type, control voltages being supplied to gates of the first current source transistor and the second current source transistor, respectively; a first switching transistor of the first conductivity type, and a second switching transistor of the first conductivity type; a third switching transistor of a second conductivity type, and a fourth switching transistor of the second conductivity type; first, second, third, and fourth resistor elements; and a first output node and a second output node.

21 Claims, 7 Drawing Sheets

F I G . 1
BACKGROUND

FIG. 2
BACKGROUND

DRIVER AMPLIFIER CIRCUIT AND COMMUNICATION SYSTEM

BACKGROUND

The present disclosure relates to a driver amplifier circuit which is applied to an interface through which a large-capacity video signal for a television or the like is transmitted, and a communication system using the same.

At the present time, a Low Voltage Differential Signaling (LVDS) interface is generally used in transmission of a large-capacity video signal, for example, in the inside of a television (TV).

In general, a driver amplifier circuit of the LVDS interface is composed of a current source transistor and a current switching transistor for sorting a current generated from the current source transistor into portions.

Figure 1:
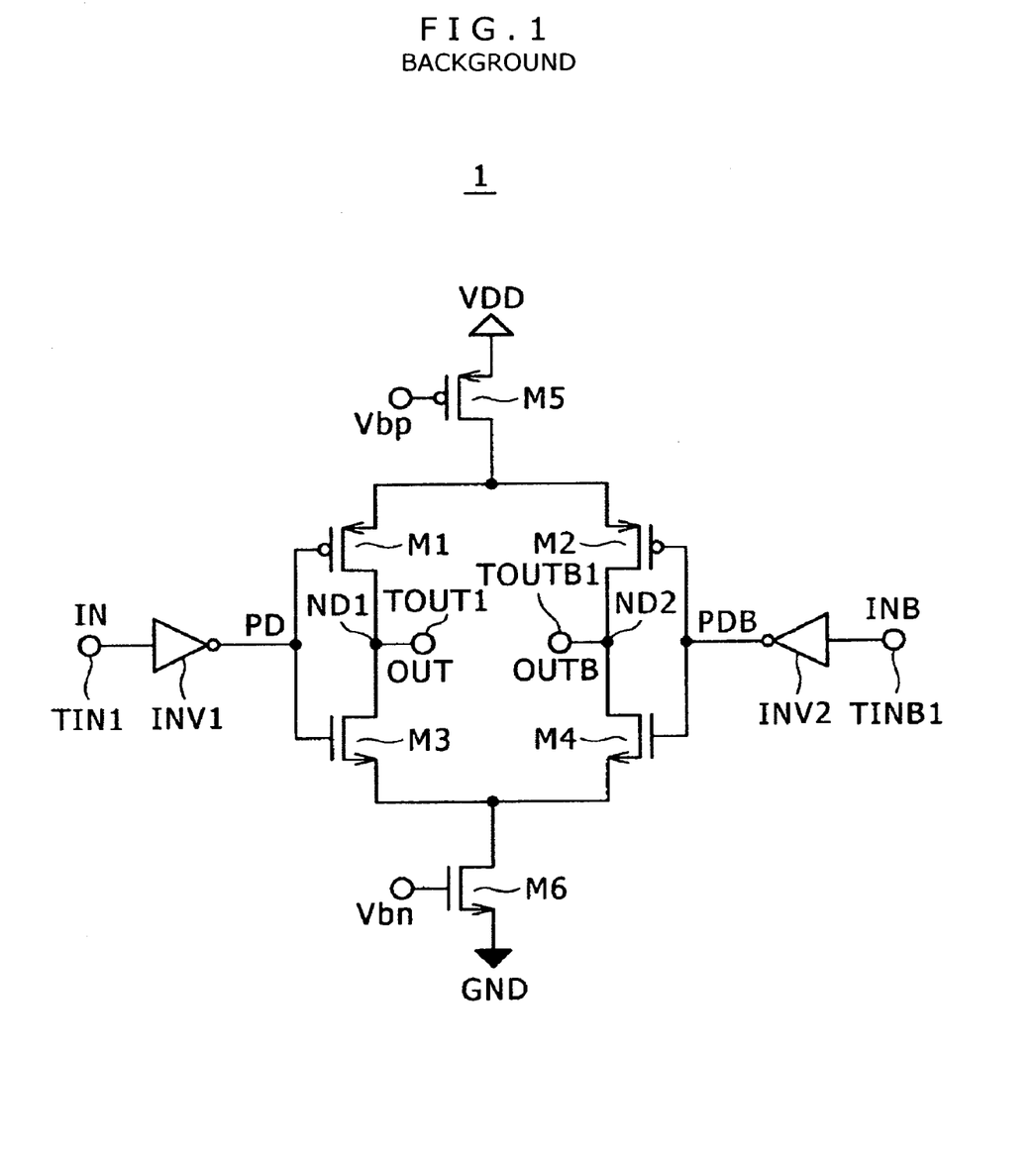
FIG. 1 is a circuit diagram showing an example of a configuration of a general driver amplifier circuit.

FIG. 1 is a circuit diagram showing an example of a configuration of a general driver amplifier circuit.

The driver amplifier circuit 1 shown in FIG. 1 includes current switching transistors M1 to M4, current source transistors M5 and M6, inverters INV1 and INV2, input terminals TIN1 and TINB1, output terminals TOUT1 and TOUTB1, and output nodes ND1 and ND2.

Each of the switching transistors M1 and M2, and the current source transistor M5 is composed of a p-channel MOS (PMOS) transistor.

Also, each of the switching transistors M3 and M4, and the current source transistor M6 is composed of an n-channel (NMOS) transistor.

A source terminal of the current source transistor M5 is connected to a power source electric potential VDD, and a source terminal of the current source transistor M5 is connected to a reference electric potential VSS, for example, the grounding electric potential GND.

A gate terminal of the current source transistor M5 is connected to a supply line for a bias voltage Vbp, and a gate terminal of the current source transistor M6 is connected to a supply line for a bias voltage Vpn.

Each of source terminals of the switching transistors M1 and M2 is connected to a drain terminal of the current source transistor M5, and each of source terminals of the switching transistors M3 and M4 is connected to a drain terminal of the current source transistor M6.

A drain terminal of the switching transistor M1, and a drain terminal of the switching transistor M3 are connected to each other, and the output node ND1 is composed of a connection point between both of the drain terminals of the switching transistor M1 and the switching transistor M3. Also, the output node ND1 is connected to the output terminal TOUT1.

A drain terminal of the switching transistor M2, and a drain terminal of the switching transistor M4 are connected to each other, and the output node ND2 is composed of a connection point between both of the drain terminals. Also, the output node ND2 is connected to the output terminal TOUTB1.

A signal IN is supplied to the input terminal TIN1, the input terminal TIN1 is connected to an input terminal of the inverter INV1, and an output terminal of the inverter INV1 is connected to each of gate terminals of the switching transistors M1 and M3.

An inverted signal INB1 of the signal IN is supplied to the input terminal TINB1, the input terminal TINB1 is connected to an input terminal of the inverter INV2, and an output terminal of the inverter INV2 is connected to each of gate terminals of the switching transistors M2 and M4.

In the driver amplifier circuit 1, the signal supplied to the input terminal TIN1 is inverted in level thereof in the inverter INV1, and the resulting inverted signal is supplied as a gate voltage signal PD to each of the gate terminals of the switching transistors M1 and M3.

The inverted signal INB1 of the signal INB supplied to the input terminal TINB1 is inverted in level thereof in the inverter INV2, and the resulting inverted signal is supplied as a gate voltage signal PDB to each of the gate terminals of the switching transistors M2 and M4.

As a result, each of the switching transistors M1 to M4 is turned ON or OFF, currents generated from the current source transistors M5 and M6 are sorted into portions, and signals OUT and OUTB having desired amplitudes are outputted through the output terminals TOUT1 and TOUTB1, respectively.

In the driver amplifier circuit 1 shown in FIG. 1, output voltages of the output signals OUT and OUTB are determined depending on an impedance as will be described below. That is to say, the output voltages of the output signals OUT and OUTB are determined depending on an output current as a current source, and an impedance of a load circuit when the current source transistors M5 and M6 are set at biases at which the current source transistors M5 and M6 enter saturated regions, respectively. Also, the output voltages of the output signals OUT and OUTB are determined depending on ON resistances of the transistors M1 to M6, and the impedance of the load circuit when the current source transistors M5 and M6 are set at biases at which the current source transistors M5 and M6 enter linear regions, respectively.

SUMMARY

However, in the LVDS driver amplifier circuit 1 having the configuration described above, when the power source voltages, for example, is as low as 2 V or less, the drive voltages for the transistors disposed on the power source side and on the GND side, respectively, become asymmetric.

Figure 2:
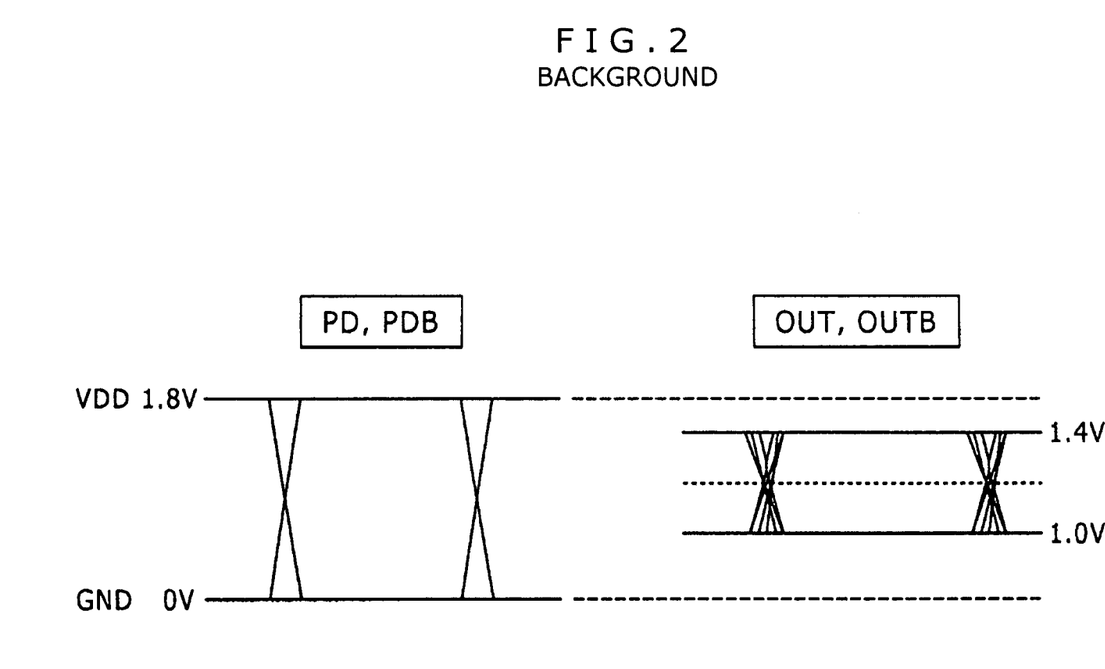
FIG. 2 is a waveform chart of input and output voltages in the general driver amplifier circuit shown in FIG. 1.

As a result, it is found out that in the LVDS driver amplifier circuit 1 described above, as shown in FIG. 2, a waveform distortion is caused in an output waveform. This, for example, is described in U.S. Pat. No. 6,975,141.

In addition, as described above, in the driver amplifier circuit 1 shown in FIG. 1, the output voltages of the output signals OUT and OUTS are determined depending either on the output currents as the current sources of the transistors or on the ON resistances.

For this reason, it is necessary to provide a bias adjusting circuit for the current source transistors M5 and M6, and a pre-driver circuit for adjusting gate voltages PD and PDB for driving for the switching transistors M1 to M4 in the driver amplifier circuit 1. It is difficult to maintain the stability of the control for an in-phase electric potential of the output signal when the driver amplifier circuit 1 is set so that the current source transistors M5 and M6 enter the saturated regions, respectively, and the load is formed as a differential end terminal in which the load resistor is connected between the output terminals TOUT and TOUTB1 because a gain of an output in-phase electric potential as a control object for the bias voltages Vbp and Vpn as control input voltages is very large. When the driver amplifier circuit 1 is set so that the current source transistors M5 and M6 enter the linear regions, respectively, all of the ON resistances of the transistors M1 to M6 contribute to the output voltage, and the biases of the transistors M1 to M6 are changed due to the element characteristics dispersion, the power source voltage fluctuation and the temperature change which are caused by the fluctuations of the circuit manufacturing process. Therefore, it is very difficult to stably control the output signal under all of the conditions.

The present disclosure has been made in order to solve the problems described above, and it is therefore desirable to provide a driver amplifier circuit which is capable of stably controlling an output signal without using any of a complicated bias adjusting circuit and pre-driver circuit, and is capable of reducing a waveform distortion of an output waveform, and a communication system using the same.

In order to attain the desire described above, according to an embodiment of the present disclosure, there is provided a driver amplifier circuit including: a first current source transistor of a first conductivity type, and a second current source transistor of the first conductivity type, control voltages being supplied to gates of the first current source transistor and the second current source transistor, respectively; a first switching transistor of the first conductivity type, and a second switching transistor of the first conductivity type; a third switching transistor of a second conductivity type, and a fourth switching transistor of the second conductivity type; first, second, third, and fourth resistor elements; and a first output node and a second output node. In the first switching transistor, a source thereof is connected to a first power source electric potential, and a drain thereof is connected to the first output node through the first resistor element. In the second switching transistor, a source thereof is connected to the first power source electric potential, and a drain thereof is connected to the second output node through the second resistor element. In the third switching transistor, a source thereof is connected to the second power source electric potential, and a drain thereof is connected to the first output node through the third resistor element. In the fourth switching transistor, a source thereof is connected to the second power source electric potential, and a drain thereof is connected to the second output node through the fourth resistor element. In the first current source transistor, a source thereof is connected to the first power source electric potential, and a drain thereof is connected to the first output node In the second current source transistor, a source thereof is connected to the first power source electric potential, and a drain thereof is connected to the second output node. Each of gates of the first and third switching transistors is connected to a supply line for an input signal which is set to a first level at which the first current source transistor, first switching transistor, and second switching transistor of the first conductivity type are caused to be in a non-conduction state, and the second current source transistor, third switching transistor, and fourth switching transistor of the second conductivity type are caused to be in a conduction state, and is set to a second level at which the first current source transistor, first switching transistor and second switching transistor of the first conductivity type are caused to be in the conduction state, and the second current source transistor, third switching transistor, and fourth switching transistor of the second conductivity type are caused to be in the non-conduction state. Each of the gates of the second and fourth switching transistors is connected to a supply line for an inverted signal of the input signal.

According to another embodiment of the present disclosure, there is provided a communication system including: a transmitting apparatus including a driver amplifier circuit transmitting data with a low amplitude to a line; and a receiving apparatus receiving the data transmitted thereto from the transmitting apparatus. The driver amplifier circuit of the transmitting apparatus includes: a first current source transistor of a first conductivity type, and a second current source transistor of the first conductivity type, control voltages being supplied to gates of the first current source transistor and the second current source transistor, respectively; a first switching transistor of the first conductivity type, and a second switching transistor of the first conductivity type; a third switching transistor of a second conductivity type, and a fourth switching transistor of the second conductivity type; first, second, third, and fourth resistor elements; and a first output node and a second output node. In the first switching transistor, a source thereof is connected to a first power source electric potential, and a drain thereof is connected to the first output node through the first resistor element. In the second switching transistor, a source thereof is connected to the first power source electric potential, and a drain thereof is connected to the second output node through the second resistor element. In the third switching transistor, a source thereof is connected to the second power source electric potential, and a drain thereof is connected to the first output node through the third resistor element. In the fourth switching transistor, a source thereof is connected to the second power source electric potential, and a drain thereof is connected to the second output node through the fourth resistor element. In the first current source transistor, a source thereof is connected to the first power source electric potential, and a drain thereof is connected to the first output node In the second current source transistor, a source thereof is connected to the first power source electric potential, and a drain thereof is connected to the second output node. Each of gates of the first and third switching transistors is connected to a supply line for an input signal which is set to a first level at which the first current source transistor, first switching transistor, and second switching transistor of the first conductivity type are caused to be in a non-conduction state, and the second current source transistor, third switching transistor, and fourth switching transistor of the second conductivity type are caused to be in a conduction state, and is set to a second level at which the first current source transistor, first switching transistor and second switching transistor of the first conductivity type are caused to be in the conduction state, and the second current source transistor, third switching transistor, and fourth switching transistor of the second conductivity type are caused to be in the non-conduction state. Each of the gates of the second and fourth switching transistors is connected to a supply line for an inverted signal of the input signal.

As set forth hereinabove, according to the present disclosure, both of the bias adjusting circuit and the pre-driver circuit are unnecessary, and it is possible to reduce the waveform distortion of the output waveform.

DETAILED DESCRIPTION OF THE PREFERRED EMBODIMENTS

Embodiments of the present disclosure will be described in detail hereinafter with reference to the accompanying drawings.

It is noted that the description will be given below in accordance with the following order:
1. First Embodiment (Communication System);
2. Second Embodiment (First Configuration of Driver Amplifier Circuit);
3. Third Embodiment (Second Configuration of Driver Amplifier Circuit); and
4. Fourth Embodiment (Third Configuration of Driver Amplifier Circuit).

1. First Embodiment

Figure 3:
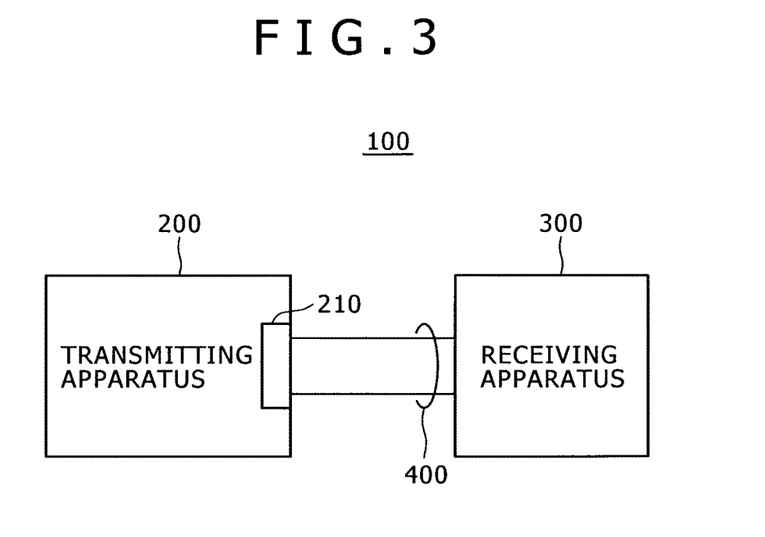
FIG. 3 is a block diagram showing a basic configuration of a communication system according to a first embodiment of the present disclosure.

FIG. 3 is a block diagram showing a basic configuration of a communication system according to a first embodiment of the present disclosure.

The communication system 100 is composed of a transmitting apparatus 200, a recording apparatus 300, and a transmission line 400.

The transmitting apparatus 200 has a function of converting N-bit parallel data into 1-bit serial data.

The transmitting apparatus 200 includes a driver amplifier circuit 210. In this case, the driver amplifier circuit 210 sends the serial data with a low amplitude (for example, 300 mV (0.3 V) or 400 mV (0.4 V)) close to the grounding electric potential to a transmission line 400.

The receiving apparatus 300 receives the serial data transmitted thereto from the transmitting apparatus 200.

In such a way, the serial data sent from the driver amplifier circuit 210 of the transmitting apparatus 200 is transmitted to the receiving side through the transmission line 400.

It should be noted that details of the driver amplifier circuit 210 composing the transmitting apparatus 200 in the communication system 100 will be described in the following second to fourth embodiments of the present disclosure.

2. Second Embodiment

Figure 4:
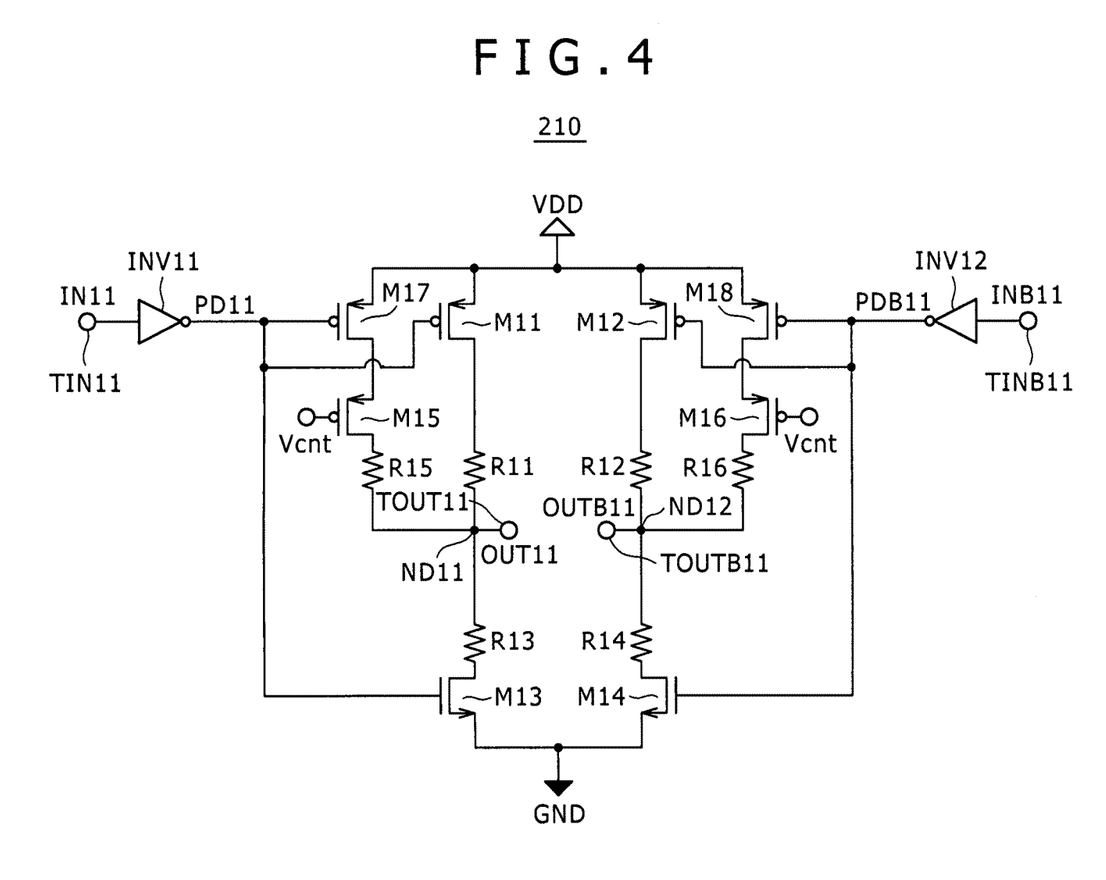
FIG. 4 is a circuit diagram showing a configuration of a driver amplifier circuit in a transmitting apparatus according to a second embodiment of the present disclosure.

FIG. 4 is a circuit diagram showing a configuration of a driver amplifier circuit in a transmitting apparatus according to a second embodiment of the present disclosure.

The driver amplifier circuit 210 shown in FIG. 4 includes a first switching transistor M11 and a second switching transistor M12. In this case, each of the first and second switching transistors M11 and M12 is composed of a field effect transistor (FET) of a first conductivity type (a p type in the second embodiment), that is, a p-channel FET.

The driver amplifier circuit 210 includes a third switching transistor M13 and a fourth switching transistor M14. In this case, each of the third and fourth switching transistors M13 and M14 is composed of an FET of a second conductivity type (an n type in the second embodiment), that is, an n-channel FET.

The driver amplifier circuit 210 includes a first current source transistor M15 and a second current source transistor M16 to each of gate electrodes of which a control voltage Vcnt is supplied. In this case, each of the first and second current source transistors M15 and M16 is composed of an FET of the p type (the first conductivity type), that is, the p-channel FET.

The driver amplifier circuit 210 includes a fifth switching transistor M17 and a sixth switching transistor M18 each of which is composed of a p-channel FET.

The driver amplifier circuit 210 includes a first resistor element R11, a second resistor element R12, a third resistor element R13, a fourth resistor element R14, a fifth resistor element R15, and a sixth resistor element R16.

In addition, the driver amplifier 210 includes a first output node ND11, a second output node ND12, inverters INV11 and NV12, input terminals TIN11 and TINB11, and output terminals TOUT11 and TOUTB11.

It is noted that in the second embodiment, a first power source electric potential corresponds to a power source electric potential VDD, and the power source electric potential VDD is set to 2 V or less, for example, 1.8 V.

In addition, a second power source electric potential as a reference electric potential corresponds to the grounding electric potential GND.

A source terminal of the first switching transistor M11 is connected to the power source electric potential VDD, and a drain terminal thereof is connected to the first output node ND11 through the first resistor element R11. That is to say, the drain terminal of the first switching transistor M11 is connected to one end of the first resistor element R11, and the other end of the first resistor element R11 is connected to the first output node ND11.

A source terminal of the second switching transistor M12 is connected to the power source electric potential VDD, and a drain terminal thereof is connected to the second output node ND12 through the second resistor element R12. That is to say, the drain terminal of the second switching transistor M12 is connected to one end of the second resistor element R12, and the other terminal of the second resistor element R12 is connected to the second output node ND12.

A source terminal of the third switching transistor M13 is connected to the grounding electric potential GND, and a drain terminal thereof is connected to the first output node ND11 through the third resistor element R13. That is to say, the drain terminal of the third switching transistor M13 is connected to one end of the third resistor element R13, and the other end of the third resistor element R13 is connected to the first output node ND11.

A source terminal of the fourth switching transistor M14 is connected to the grounding electric potential GND, and a drain terminal thereof is connected to the second output node ND12 through the fourth resistor element R14. That is to say, the drain terminal of the fourth switching transistor M14 is connected to one end of the fourth resistor element R14, and the other end of the fourth resistor element R14 is connected to the second output node ND12.

A source terminal of the fifth switching transistor M17 is connected to the power source electric potential VDD, and a drain terminal thereof is connected to a source terminal of the first current source transistor M15.

A source terminal of the sixth switching transistor M18 is connected to the power source electric potential VDD, and a drain terminal thereof is connected to a source terminal of the second current source transistor M16.

A drain terminal of the first current source transistor M15 is connected to the first output node ND11 through the fifth resistor element R15. That is to say, the drain terminal of the first current source transistor M15 is connected to one end of the fifth resistor element R15, and the other end of the fifth resistor element R15 is connected to the first output node ND11.

A drain terminal of the second current source transistor M16 is connected to the second output node ND12 through the sixth resistor element R16. That is to say, the drain terminal of the second current source transistor M16 is connected to one end of the sixth resistor element R16, and the other end of the sixth resistor element R16 is connected to the second node ND12.

The first output node ND11 is connected to an output terminal TOUT11 for the voltage OUT, and the second output node ND12 is connected to an output terminal TOUTB11 for the voltage OUTB.

An input signal IN11 is supplied to the input terminal TIN11.

The input terminal TIN11 is connected to an input terminal of the inverter INV11.

An output terminal of the inverter INV11 is connected to each of gate terminals of the first switching transistor M11, the third switching transistor M13, and the fifth switching transistor M17.

An inverted signal INB11 of the input signal IN11 is supplied to the input terminal TINB11.

The input terminal TINB11 is connected to an input terminal of the inverter INV12.

An output terminal of the inverter INV12 is connected to each of gate terminals of the second switching transistor M12, the fourth switching transistor M14, and the sixth switching transistor M18.

The signal IN11 is set to a first level at which a transistor of a p type (first conductivity type), that is, a p-channel transistor is caused to be in a non-conduction state, and a transistor of an n type (second conductivity type), that is, an n-channel transistor is caused to be in a conduction state, and is set to a second level at which the transistor of the p type (first conductivity type), that is, the p-channel transistor is caused to be in the conduction state, and the transistor of the n type (second conductivity type), that is, the n-channel transistor is caused to be in the non-conduction state.

In the second embodiment, the first level of the signal IN11 is a power source voltage level, and the second level is the grounding electric potential level.

When the signal IN11 is set at the first level, an output voltage (gate voltage) PD11 from the inverter INV11 is set at the second level. At this time, the inverted signal INB11 is set at the second level, and an output voltage (gate voltage) PDB11 from the inverter INV12 is set at the first level.

In this case, each of the first switching transistor M11, the fifth switching transistor M17, and the fourth switching transistor M14 becomes a conduction state (ON state).

On the other hand, each of the second switching transistor M12, the sixth switching transistor M18, and the third switching transistor M13 becomes a non-conduction state (OFF state).

When the signal IN11 is set at the second level, the output voltage (gate voltage) PD11 from the inverter INV11 is set at the first level. At this time, the inverted signal INB11 is set at the first level, and the output voltage (gate voltage) PDB11 from the inverter INV11 is set at the second level.

In this case, each of the first switching transistor M11, the fifth switching transistor M17, and the fourth switching transistor M14 becomes the non-conduction state (OFF state).

On the other hand, each of the second switching transistor M12, the sixth switching transistor M18, and the third switching transistor M13 becomes the conduction state (ON state).

In the second embodiment, for the purpose of uniformizing the gate voltages in accordance with which the switching transistors M11 to M14 are driven, respectively, the first and second switching transistors M11 and M12, and the third and fourth switching transistors M13 and M14 are disposed on the power source side and on the GND side, respectively.

In addition, in the second embodiment, for the purpose of stabilizing driving amplitudes for the first to fourth switching transistors M11 to M14, the first and third resistor elements R11 and R13 are connected between the drain terminals of the first and third switching transistors M11 and M13, and the output node ND11, respectively. Also, the second and fourth resistor elements R12 and R14 are connected between the drain terminals of the second and fourth switching transistors M12 and M14, and the output node ND12, respectively.

That is to say, a current generated from the first current source transistor M15 is supplied to the first output node ND11 through the fifth resistor element R15.

The first resistor element R11 and the third resistor R13 are connected between the first output node ND11 and the drain terminal of the first switching transistor M11, and between the first output node ND11 and the drain terminal of the third switching transistor M13, respectively.

The first resistor element R11 and the third resistor element R13 stabilize the driving amplitudes for the first switching transistor M11 and the third switching transistor M13.

Likewise, the second resistor element R12 and the fourth resistor element R14 are connected between the second output node ND12 and the drain terminal of the second switching transistor M12, and between the second output node ND12 and the drain terminal of the fourth transistor M14, respectively.

The second resistor element R12 and the fourth resistor element R14 stabilize the driving amplitudes for the second switching transistor M12 and the fourth switching transistor M14.

In the driver amplifier circuit 210, the signal IN11 supplied to the input terminal TIN11 is inverted in level thereof in the inverter INV11, and the resulting inverted signal is supplied as the gate voltage signal PD11 to each of the gate terminals of the first, third, and fifth switching transistors M11, M13, and M17.

The signal INB11 supplied to the input terminal TINB11 is inverted in level thereof in the inverter INV12, and the resulting inverted signal is supplied as the gate voltage signal PDB11 to each of the gate terminals of the second, fourth, and sixth switching transistors M12, M14, and M18.

As a result, the first to fourth switching transistors M11 to M14 are turned ON or OFF, and the currents generated from the first and second current source transistors M15 and M16 are approximately, equally sorted. Thus, the signals OUT11 and OUTB11 having the desired amplitudes are outputted through the output terminals TOUT11 and TOUTB11, respectively.

The output signal voltages OUT11 and OUTB11 are not determined depending on the ON resistance of the transistor, but are determined depending on the first to fourth resistor elements R11, R12, R13, and R14, and the output termination resistors connected to the output terminals TOUT11 and TOUTB11, respectively.

It is noted that at this time, the fifth and sixth switching transistors M17 and M18 are also turned ON or OFF. The reason why the fifth and sixth switching transistors M17 and M18 are provided is described as follows.

The currents are usually adjusted by the first and second current source transistors M15 and M16, whereas the first to fourth switching transistors M11 to M14 are repetitively turned ON or OFF.

For this reason, for example, when the source terminal of the first current source transistor M15 is directly connected to the power source in the case where the second and third switching transistors M12 and M13 are held in the ON state, and the first and fourth switching transistors M11 and M14 are held in the OFF state, the following leakage path is formed.

That is to say, a leakage path exists in parallel with a path extending from the second switching transistor M12 to the second resistor element R12 which should not essentially conduct. Thus, it becomes very difficult to adjust the output voltage.

In order to cope with this situation, the fifth and sixth switching transistors M17 and M18 which are operated in conjunction with the first and second switching transistors M11 and M12 connected in parallel with the power source sides of the first and second current source transistors M15 and M16, respectively, are added, thereby interrupting the leakage path.

As has been described so far, according to the second embodiment, for the purpose of uniformizing the gate voltages in accordance with which the first to fourth switching transistors M11 to M14 are driven, respectively, the first and second switching transistors M11 and M12, and the third and fourth switching transistors M13 and M14 are disposed on the power source VDD side and on the GND side, respectively.

In addition, in the second embodiment, for the purpose of stabilizing the driving amplitudes for the first to fourth switching transistors M11 to M14, the first and third resistor elements R11 and R13 are connected between the drain terminals of the first and third switching transistors M11 and M13, and the output node ND11, respectively. Also, the second and fourth resistor elements R12 and R14 are connected between the drain terminals of the second and fourth switching transistors M12 and M14, and the output node ND12, respectively.

In the driver amplifier circuit 1 shown in FIG. 1, actually, the driver output voltages OUT and OUTB are determined depending on the output current as the current source, or the ON resistance of the transistor. For this reason, it is necessary to provide the bias adjusting circuit for the current source transistor M5 and M6, and the pre-driver circuit for adjusting the gate voltages PD and PDB in accordance with which the switching transistors M1 and M3, and the switching transistors M2 and M4 are driven, respectively.

On the other hand, in the driver amplifier circuit 210 according to the second embodiment, the gate voltage of the first and fourth switching transistors M11 and M14 are driven in a full-swing manner by the power source voltage/GND.

Also, the output voltages OUT11 and OUTB11 are not determined depending on the ON resistance of the transistor, but are determined depending on the first to fourth resistor elements R11, R12, R13, and R14, and the output termination resistors connected to the output terminals TOUT11 and TOUTB11, respectively.

As a result, it is possible to omit both of the bias adjusting circuit and the pre-driver circuit which are necessary for the driver amplifier circuit 1 shown in FIG. 1.

In addition, in the second embodiment, the first to fourth transistors M11 to M14 disposed on the power source/GND side are driven in the full-swing manner. Therefore, for the output voltages, an influence of the resistance value dispersion has a tendency to become larger than an influence of the threshold dispersion of the transistors.

However, when there is the dependency on the transistor characteristics, the adjustment becomes complicated because the characteristics dispersion of the different kinds of transistors (such as the PMOSs and the NMOSs) which are disposed on the power source side and on the GND side, respectively, need to be taken into consideration.

On the other hand, in the case of the driver amplifier circuit 210 according to the second embodiment of the present disclosure, the adjustment can be readily carried out because when the resistors having the same physicality are used, it is only necessary to take only the characteristics dispersion of the resistors into consideration.

In addition, according to the second embodiment of the present disclosure, under the low power source voltage of, for example, 2 V or less, the driver amplifier circuit can be realized with the simple configuration while the waveform distortion is suppressed.

3. Third Embodiment

Figure 5:
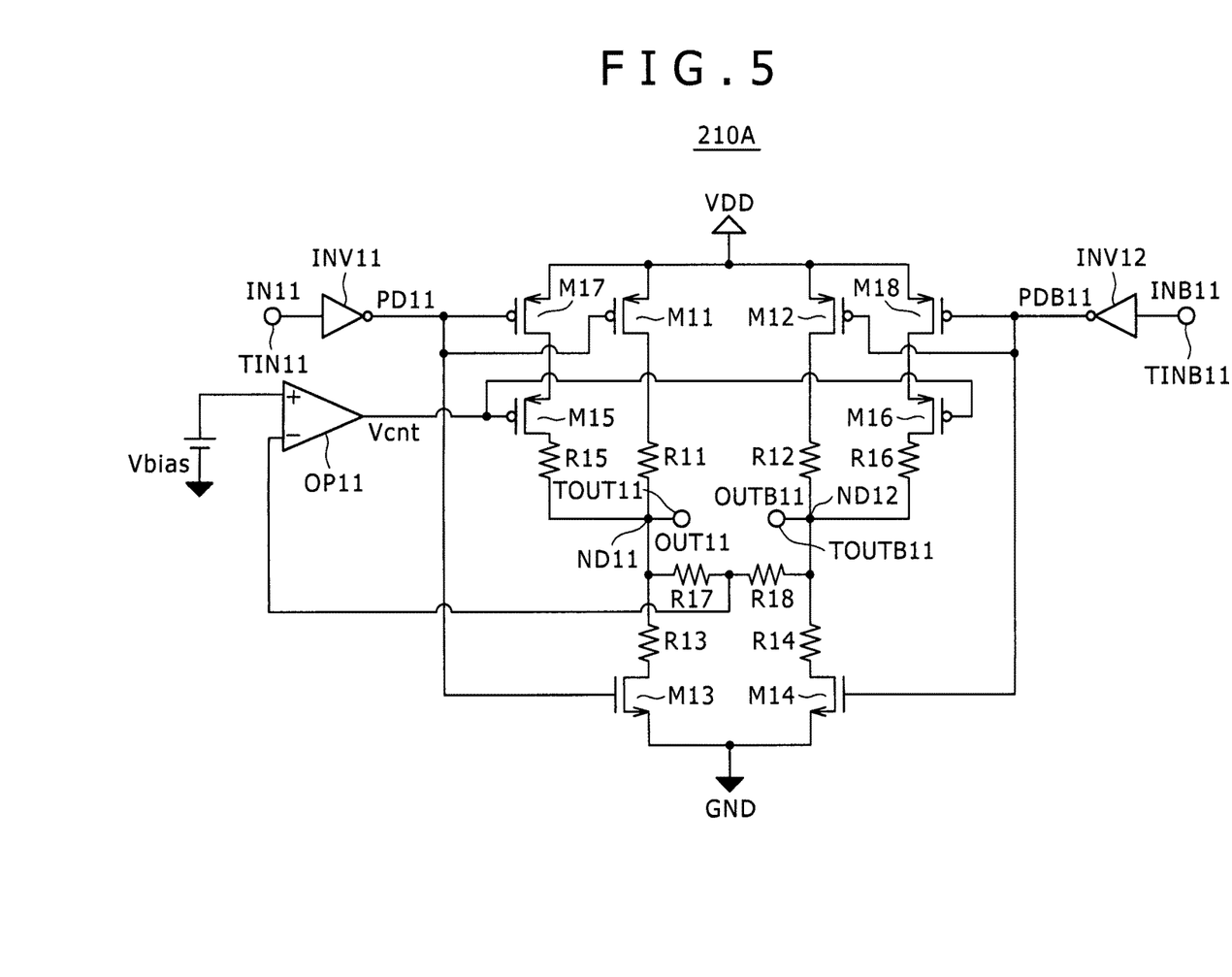
FIG. 5 is a circuit diagram showing a configuration of a driver amplifier circuit in a transmitting apparatus according to a third embodiment of the present disclosure.

FIG. 5 is a circuit diagram showing a configuration of a driver amplifier circuit in a transmitting apparatus according to a third embodiment of the present disclosure.

The driver amplifier circuit 210A of the third embodiment is different from the driver amplifier circuit 210 of the second embodiment in that a feedback circuit maintaining a common mode voltage is added.

The driver amplifier circuit 210A includes an operational amplifier OP11, and a seventh resistor element R17 and an eighth resistor element R18 which are connected in series between the first output node ND11 and the second output node ND12 in addition to the constituent elements composing the configuration shown in FIG. 4.

A non-inverting input terminal (+) of the operational amplifier OP11 is connected to a bias power source Vbias, an inverting input terminal (−) thereof is connected to a node between the resistor element R17 and the resistor element R18, and an output terminal thereof is connected to each of the gate terminals of the first and second current source transistors M15 and M16.

In the driver amplifier circuit 210A, a control voltage supplied to each of the gate terminals of the first and second current source transistors M15 and M16 is generated in accordance with an intermediate voltage developed across the first output node ND11 and the second output node ND12, and the bias voltage Vbias previously set.

As previously stated, the currents are usually adjusted by the first and second current source transistors M15 and M16, whereas the first to fourth switching transistors M11 to M14 are repetitively turned ON or OFF.

For this reason, for example, when the source terminal of the first current source transistor M15 is directly connected to the power source in the case where the second and third switching transistors M12 and M13 are held in the ON state, and the first and fourth switching transistors M11 and M14 are held in the OFF state, the following leakage path is formed.

That is to say, a leakage path exists in parallel with a path extending from the second switching transistor M12 to the second resistor element R12 which should not essentially conduct. Thus, it becomes very difficult to adjust the output voltage.

In order to cope with this situation, the fifth and sixth switching transistors M17 and M18 which are operated in conjunction with the first and second switching transistors M11 and M12 connected in parallel with the power source sides of the first and second current source transistors M15 and M16, respectively, are added, thereby interrupting the leakage path.

Also, the output voltages OUT11 and OUTB11 can be determined depending on the first to fourth resistor elements R11, R12, R13, and R14 and the output termination resistors connected to the output terminals TOUT11 and TOUTB11, respectively, and the common mode voltage can be maintained.

In the third embodiment, other configurations are the same as those in the second embodiment and it is possible to obtain the same effects as those in the second embodiment.

4. Fourth Embodiment

Figure 6:
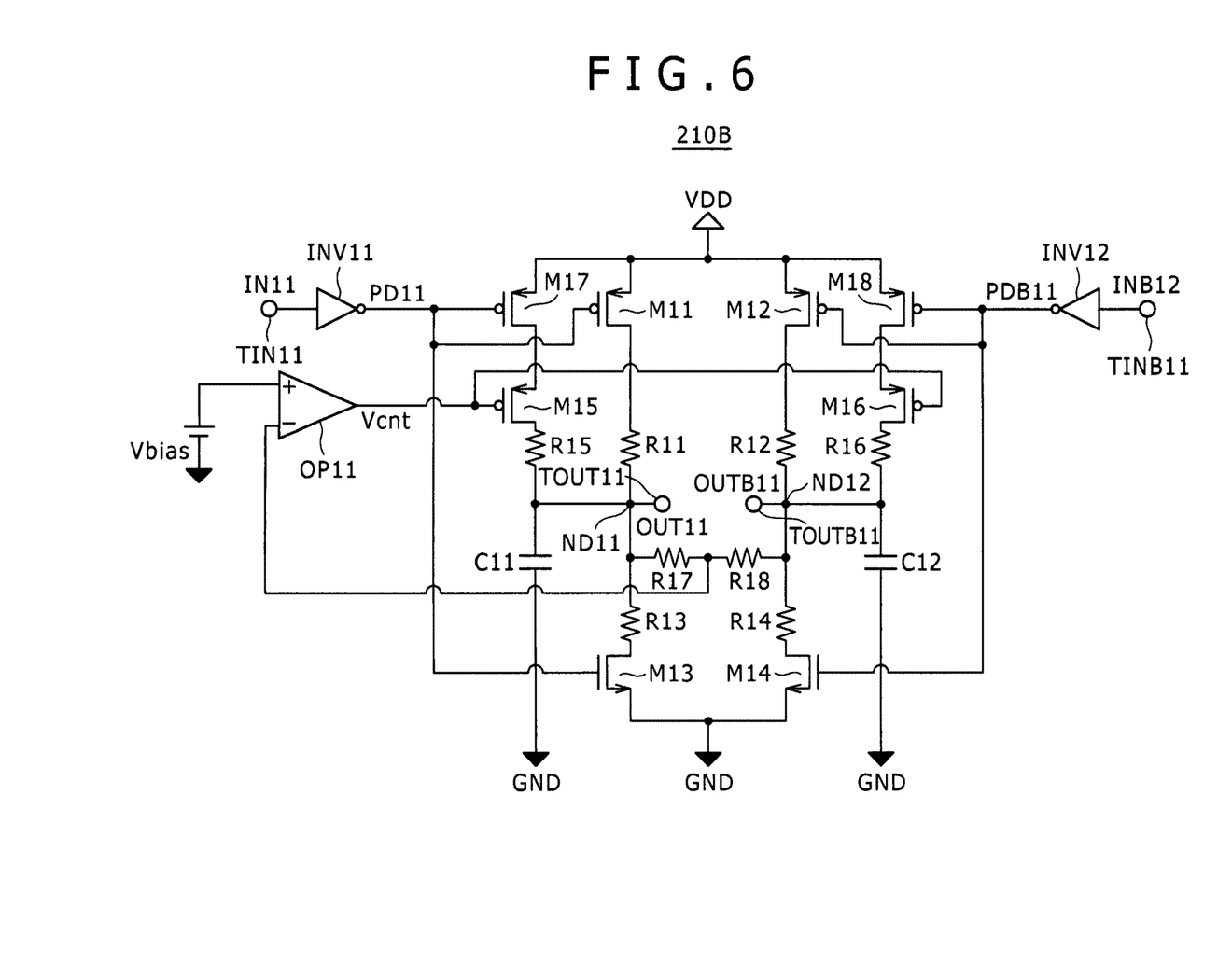
FIG. 6 is a circuit diagram showing a configuration of a driver amplifier circuit in a transmitting apparatus according to a fourth embodiment of the present disclosure.

FIG. 6 is a circuit diagram showing a configuration of a driver amplifier circuit in a transmitting apparatus according to a fourth embodiment of the present disclosure.

The driver amplifier circuit 210B of the fourth embodiment is different from the driver amplifier circuit 210A of the third embodiment in that capacitors are added between the first and second output nodes ND11 and ND12, and the grounding electric potential GND.

Specifically, a first capacitor C11 is connected between the first output node ND11 and the grounding electric potential GND. Also, a second capacitor C12 is connected between the second output node ND12 and the grounding electric potential GND.

Figure 7A:
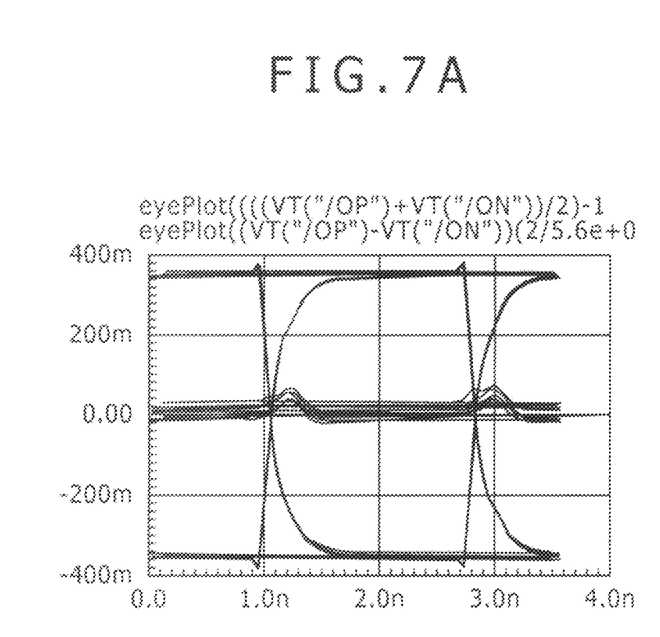
FIGS. 7A and 7B are respectively a graph when the capacitors are not connected to the output nodes, and a graph when the capacitors are connected to the output nodes, respectively.
Figure 7B:
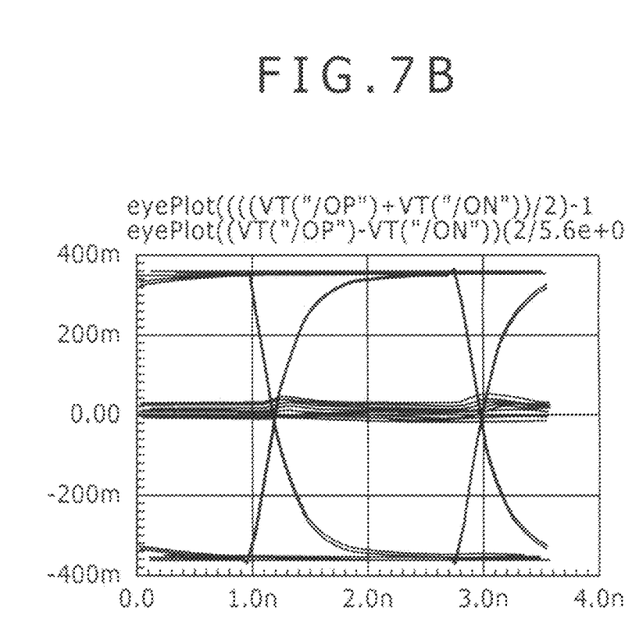

FIGS. 7A and 7B are respectively a graph when the capacitors are not connected to the output nodes, and a graph when the capacitors are connected to the output nodes, respectively.

FIG. 7A is a waveform showing a waveform pattern when the capacitors are not connected to the output nodes, respectively, and FIG. 7B is a waveform showing a waveform pattern when the capacitors is connected to the output nodes, respectively.

In the driver amplifier 210B shown in FIG. 6, the first capacitor C11 and the second capacitor C12 are added. Therefore, the provision of the capacitors C11 and C12, and the resistors results in that it is possible to reduce the waveform distortion caused by the uniformity in waveform rising0falling in a phase of the switching.

In the fourth embodiment, other configurations are the same as those in the third embodiment and it is possible to obtain the same effects as those in each of the second and third embodiments.

It is noted that although the driver amplifier circuit for the single output differential voltage level has been given as the embodiments, it is also possible to realize plural output differential voltage levels.

In this case, with regard to the driver amplifier circuits 210, 210A, and 210B shown in FIGS. 4, 5 and, 6, respectively, the same circuits are connected in parallel with one another with the output voltages OUT and OUTB as being common. Under this condition, the resistance values corresponding to the resistors R11, R12, R13, and R14 in each of the driver amplifier circuits 210, 210A, and 210B are adjusted, thereby making it possible to readily realize the driver amplifier circuit for the plural differential voltage levels.

The present disclosure contains subject matter related to that disclosed in Japanese Priority Patent Application JP 2010-198761 filed in the Japan Patent Office on Sep. 6, 2010, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A driver amplifier circuit comprising:
   a first current source transistor of a first conductivity type, and a second current source transistor of the first conductivity type, control voltages being supplied to gates of said first current source transistor and said second current source transistor, respectively;
   a first switching transistor of the first conductivity type, and a second switching transistor of the first conductivity type;
   a third switching transistor of a second conductivity type, and a fourth switching transistor of the second conductivity type;
   first, second, third, and fourth resistor elements; and
   a first output node and a second output node, wherein
   in said first switching transistor, a source thereof is connected to a first power source electric potential, and a drain thereof is connected to said first output node through said first resistor element,
   in said second switching transistor, a source thereof is connected to the first power source electric potential, and a drain thereof is connected to said second output node through said second resistor element,
   in said third switching transistor, a source thereof is connected to the second power source electric potential, and a drain thereof is connected to said first output node through said third resistor element,
   in said fourth switching transistor, a source thereof is connected to the second power source electric potential, and a drain thereof is connected to said second output node through said fourth resistor element,
   in said first current source transistor, a source thereof is connected to the first power source electric potential, and a drain thereof is connected to said first output node,
   in said second current source transistor, a source thereof is connected to the first power source electric potential, and a drain thereof is connected to said second output node,
   each of gates of said first and third switching transistors is connected to a supply line for an input signal which is set to a first level at which said first current source transistor, first switching transistor, and second switching transistor of the first conductivity type are caused to be in a non-conduction state, and said second current source transistor, third switching transistor, and fourth switching transistor of the second conductivity type are caused to be in a conduction state, and is set to a second level at which said first current source transistor, first switching transistor and second switching transistor of the first conductivity type are caused to be in the conduction state, and said second current source transistor, third switching transistor, and fourth switching transistor of the second conductivity type are caused to be in the non-conduction state,
   each of said gates of said second and fourth switching transistors is connected to a supply line for an inverted signal of the input signal;
   a fifth switching transistor of the first conductivity type having a source connected to the first power source electric potential between the first power source electric potential and said source of said first current source transistor, a drain connected to said source of said first current source transistor, and a gate connected to said supply line for the input signal; and a sixth switching transistor of the first conductivity type having a source connected to the first power source electric potential between the first power source electric potential and said source of said second current source transistor, a drain connected to said source of said second current source transistor, and a gate connected to said supply line for the inverted signal.

2. A driver amplifier circuit comprising:

a power source electric potential electrically connected to a source terminal of a first switching transistor and to a source terminal of a second switching transistor;

a terminal of a first resistor element electrically connected to a terminal of a third resistor element and to a terminal of a fifth resistor element;

a drain terminal of the first switching transistor electrically connected to another terminal of the first resistor element;

a terminal of a second resistor element electrically connected to a terminal of a fourth resistor element and to a terminal of a sixth resistor element;

a drain terminal of the second switching transistor electrically connected to another terminal of the second resistor element;

a grounding electric potential electrically connected to a source terminal of a third switching transistor and to a source terminal of a fourth switching transistor;

a drain terminal of a fifth switching transistor electrically connected to another terminal of the fifth resistor element;

a source terminal of the fifth switching transistor electrically connected to a drain terminal of a seventh switching transistor;

a gate terminal of the first switching transistor electrically connected to a gate terminal of the third switching transistor and to a gate terminal of the seventh switching transistor.

3. The driver amplifier circuit according to claim 2, wherein said first switching transistor and said second switching transistor are switching transistors of a same conductivity type.

4. The driver amplifier circuit according to claim 2, wherein said third switching transistor and said fourth switching transistor are switching transistors of a conductivity type opposite to a conductivity type of said first switching transistor.

5. The driver amplifier circuit according to claim 2, further comprising:

a drain terminal of the third switching transistor electrically connected to another terminal of the third resistor element.

6. The driver amplifier circuit according to claim 2, further comprising:

a drain terminal of the fourth switching transistor electrically connected to another terminal of the fourth resistor element.

7. The driver amplifier circuit according to claim 2, further comprising:

a source terminal of the seventh switching transistor electrically connected to said power source electric potential.

8. The driver amplifier circuit according to claim 2, further comprising:

an output of an inverter electrically connected to said gate terminal of the first switching transistor.

9. The driver amplifier circuit according to claim 2, further comprising:

a gate terminal of the fifth switching transistor electrically connected to a gate terminal of a sixth switching transistor.

10. The driver amplifier circuit according to claim 9, further comprising:

a drain terminal of the sixth switching transistor electrically connected to another terminal of the sixth resistor element.

11. The driver amplifier circuit according to claim 10, further comprising:

a source terminal of the sixth switching transistor electrically connected to a drain terminal of an eighth switching transistor.

12. The driver amplifier circuit according to claim 11, further comprising:

a source terminal of the eighth switching transistor electrically connected to said power source electric potential.

13. The driver amplifier circuit according to claim 2, further comprising:

a terminal of a first capacitor electrically connected to said terminal of the first resistor element, said grounding electric potential being electrically connected to another terminal of the first capacitor.

14. The driver amplifier circuit according to claim 13, further comprising:

a terminal of a second capacitor electrically connected to said terminal of the second resistor element, said grounding electric potential being electrically connected to another terminal of the second capacitor.

15. A communication system comprising:

a transmitting apparatus configured to transmit data, said transmitting apparatus including the driver amplifier circuit according to claim 2;

a receiving apparatus configured to receive said data.

16. A driver amplifier circuit comprising:

a power source electric potential electrically connected to a source terminal of a first switching transistor and to a source terminal of a second switching transistor;

a terminal of a first resistor element electrically connected to a terminal of a third resistor element and to a terminal of a fifth resistor element;

a drain terminal of the first switching transistor electrically connected to another terminal of the first resistor element;

a terminal of a second resistor element electrically connected to a terminal of a fourth resistor element and to a terminal of a sixth resistor element;

a drain terminal of the second switching transistor electrically connected to another terminal of the second resistor element;

a grounding electric potential electrically connected to a source terminal of a third switching transistor and to a source terminal of a fourth switching transistor;

a drain terminal of a fifth switching transistor electrically connected to another terminal of the fifth resistor element;

a gate terminal of the fifth switching transistor electrically connected to a gate terminal of a sixth switching transistor;

an inverting input terminal of an operational amplifier electrically connected to a terminal of a seventh resistor element and to a terminal of an eighth resistor element, another terminal of the seventh resistor element being element electrically connected to another terminal of the first resistor element.

17. The driver amplifier circuit according to claim 16, further comprising:

another terminal of the eighth resistor element electrically connected to another terminal of the second resistor element.

18. The driver amplifier circuit according to claim 16, further comprising:
an output terminal of the operational amplifier electrically connected to said gate terminal of the fifth switching transistor.

19. The driver amplifier circuit according to claim 16, further comprising:
a non-inverting input terminal of the operational amplifier electrically connected to a bias power source.

20. A driver amplifier circuit comprising:
a power source electric potential electrically connected to a source terminal of a first switching transistor and to a source terminal of a second switching transistor;
a terminal of a first resistor element electrically connected to a terminal of a third resistor element and to a terminal of a fifth resistor element;
a drain terminal of the first switching transistor electrically connected to another terminal of the first resistor element;
a terminal of a second resistor element electrically connected to a terminal of a fourth resistor element and to a terminal of a sixth resistor element;
a drain terminal of the second switching transistor electrically connected to another terminal of the second resistor element;
a grounding electric potential electrically connected to a source terminal of a third switching transistor and to a source terminal of a fourth switching transistor;
a drain terminal of a fifth switching transistor electrically connected to another terminal of the fifth resistor element;
a gate terminal of the fifth switching transistor electrically connected to a gate terminal of a sixth switching transistor;
a drain terminal of the sixth switching transistor electrically connected to another terminal of the sixth resistor element;
a source terminal of the sixth switching transistor electrically connected to a drain terminal of an eighth switching transistor;
a gate terminal of the second switching transistor electrically connected to a gate terminal of the fourth switching transistor and to a gate terminal of the eighth switching transistor.

21. The driver amplifier circuit according to claim 20, further comprising:
an output of an inverter electrically connected to said gate terminal of the second switching transistor.

* * * * *